March 3, 1970 C. P. IDYLL 3,499,011
PRODUCTION OF QUINONE AND HYDROQUINONE
Original Filed Dec. 19, 1962
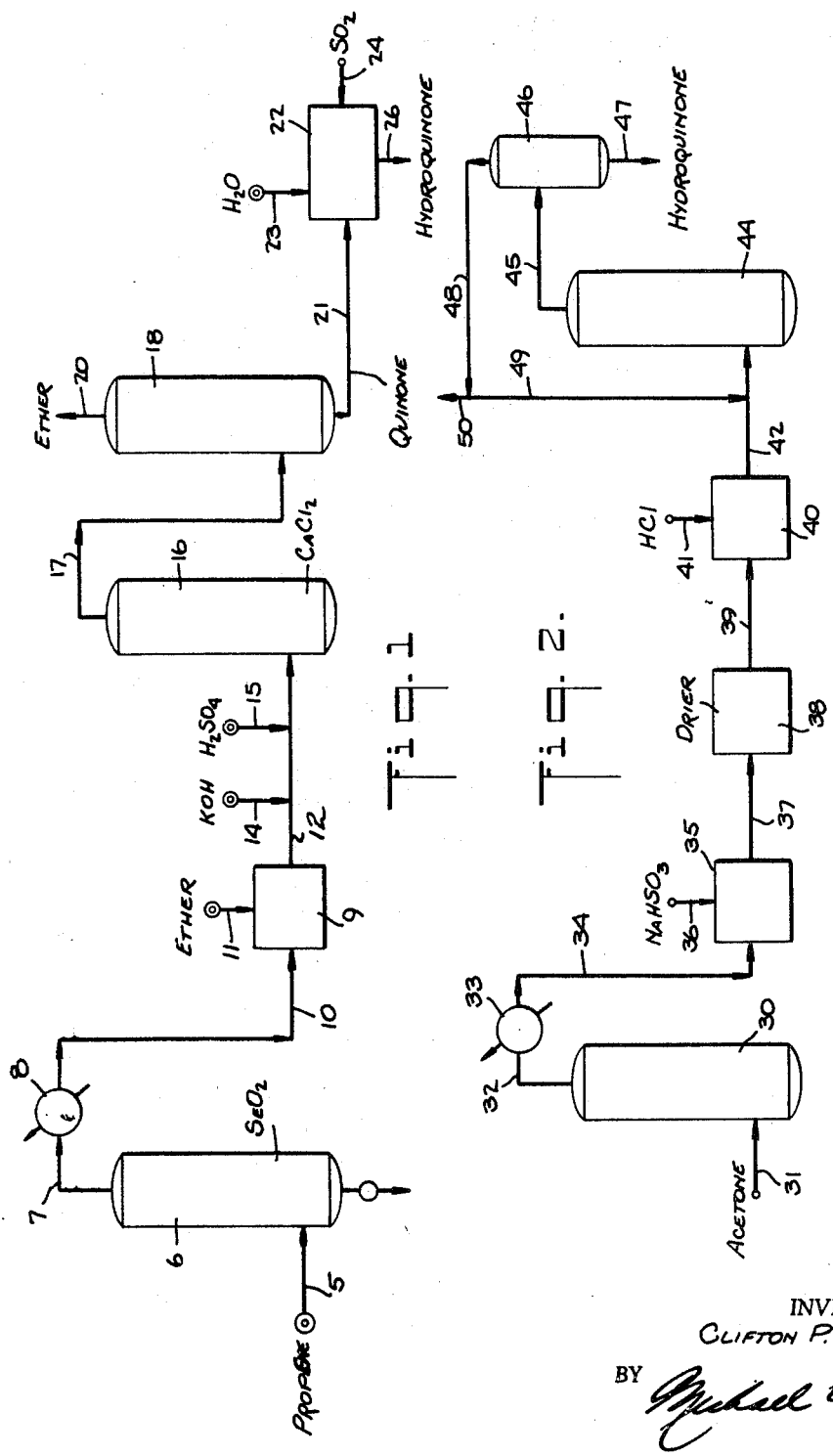
INVENTOR.
CLIFTON P. IDYLL
BY Michael Ebel
ATTORNEY United States Patent Office 3,499,011
Patented Mar. 3, 1970

3,499,011
PRODUCTION OF QUINONE AND HYDROQUINONE
Clifton P. Idyll, Huntington Station, N.Y., assignor to Trans American Chemical Co., Inc., New York, N.Y., a corporation of New York
No Drawing. Continuation of application Ser. No. 245,693, Dec. 19, 1962. This application July 18, 1966, Ser. No. 568,696
Int. Cl. C07c *49/64, 45/00, 39/08*
U.S. Cl. 260—396          8 Claims

ABSTRACT OF THE DISCLOSURE

A process for producing quinone, in which pyruvic aldehyde or an addition product thereof is passed through a zone containing an agent effecting dehydration of the aldehyde and bringing about the cyclization of two molecules of pyruvic aldehyde or the addition product to form the quinone. The quinone may be converted to hydroquinone by treatment with a reducing agent.

---

This invention relates to a novel process for the production of quinone or hydroquinone, and more particularly it pertains to the utilization of pyruvic aldehyde in the manufacture of quinone. This application is a continuation of my copending application Ser. No. 245,693, filed Dec. 19, 1962, now abandoned.

The importance of hydroquinone as an industrial chemical has spurred many workers to investigate the possibility of discovering cheaper and more efficient methods for its manufacture. In spite of the efforts made in that respect, quite unexpectedly I have found a new approach to the manufacture of hydroquinone, which not only meets the requirements of commercialization, but also lends itself to flexibility of operation which permits the manufacture to occur in a minimum number of steps or in a longer series of steps. My new approach centers around the utilization of pyruvic aldehyde as an intermediate in the production of hydroquinone.

Accordingly, an object of this invention is to provide an improved method for the production of quinone.

Another object of this invention is to provide an improved method for the production of hydroquinone.

Still another object is to provide an efficient and economical method for the manufacture of either quinone or hydroquinone.

Other objects and advantages of this invention will become apparent from the following description and explanation thereof.

In accordance with the present invention, the pyruvic aldehyde which is needed as an intermediate for the production of quinone or hydroquinone is obtained by a variety of methods. By one method, compounds containing a reactive methyl or methylene group and containing three carbon atoms in the molecule, are oxidized by means of an oxidizing agent, selenium dioxide, to produce pyruvic aldehyde. The starting material for this reaction may be propene, acetone, mesityl oxide, propionaldehyde, glyceraldehyde, glycerol, dihydroxy acetone, etc.

In another method, an organic compound containing three carbon atoms and hydroxyl groups is dehydrated or oxidized and dehydrated to produce pyruvic aldehyde. The dehydrating agent may be $P_2O_5$, anhydrous sodium bisulfate, calcium chloride, barium oxide, barium chloride, calcium oxide, etc. The pyruvic aldehyde can also be obtained from acetals, ketals, hemiacetals, or hemiketals of pyruvic aldehyde, or the ethylene glycol acetal or the ethylene thiohemi-acetal, etc. It can also be obtained by oxidizing other materials such as orthoxylene, mesityl oxide, using ozone, and by other means.

The conversion of the starting material to pyruvic aldehyde may be effected under varying conditions of temperature, pressure, time, etc. With respect to the oxidation method using selenium dioxide, the reaction is preferably conducted in the presence of a solvent which is inert under the conditions of reaction. Suitable solvents for this purpose are, for example, benzene, toluene, xylene, nitrobenzene, ether, dioxane, anisole, methanol, ethanol, butanol, pentanol, water, acetic acid, acetic anhydride, carbon tetrachloride, pyridine, hexane, ethylacetate, acetonitrile, etc.

The temperature of the oxidation reaction may also vary considerably. However, it is preferably about $-50°$ C. to $200°$ C., and still more preferred is a temperature of about $50°$ C. to $160°$ C.

The pressure of this reaction may also be varied in order that it can serve as an additional variable for keeping the reaction mass in a liquid, vapor or gaseous state and permitting the use of a temperature at which the oxidation reaction can occur at a reasonable rate. Generally, the pressure can be atmospheric, subatmospheric, or superatmospheric, for the oxidation reaction.

The oxidation reaction may take place for as long as pyruvic aldehyde is being made, or in a continuous operation the residence time of the reaction may be governed by the economical considerations of yield versus the time in which it is economically expedient to withdraw reaction products and recover the pyruvic acid. From the work done thus far, a reaction period of about 1 to 8 hours may be sufficient; however, it should be understood that the time may vary outside the range just given without departing from the spirit of the present invention.

The quantity of oxidizing agent employed in the reaction may be at least one mole per mole of starting material, or up to about 3 moles of oxidizing agent per mole of starting material. Here again, the relative proportions of oxidizing agent and starting material may vary to any extent desired, and it is borne in mind that lower yields of pyruvic aldehyde can be expected when less than the stoichiometric proportions of oxidizing agent are used.

The dehydration reaction for the production of pyruvic aldehyde depends on the material being dehydrated or oxidized and dehydrated, and may involve a temperature of about $0°$ C. to $300°$ C., preferably about $20°$ C. to $160°$ C. The pressure of the reaction is determined on the same basis as explained in connection with the oxidation reaction and can likewise be varied.

The amount of dehydrating agent to be used in the reactions may be about 0.5 to 4.0 moles per mole of starting material. The period of reaction may be from about one-quarter of an hour to three hours; however, the time may be shorter or longer for the purpose of the present invention.

In one aspect of the present invention, pyruvic aldehyde produced by any method given above, is converted to an addition product. Pyruvic aldehyde readily polymerizes to form dimers, trimers and tetramers, etc., which are not usable for the purpose of this invention; hence it is desirable to transform the pyruvic aldehyde to a non-polymerizable state. The pyruvic aldehyde is reacted with sodium bisulfite, hydrocyanic acid or sulphurous acid. The nature of the reaction can be illustrated by reference to the following example:

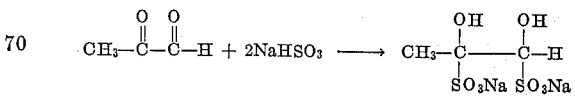

Generally an excess of addition agent is employed in the reactions, namely about 1.1 to 2.5 moles per mole of pyruvic aldehyde.

The reaction may occur at ambient temperature or it can be conducted at a temperature of about 0° C. to 80° C. The period of reaction may be from about 2 to 6 hours, more usually about 3 to 5 hours. The addition reaction is preferably carried out in a solvent, preferably an alcohol of low molecular weight, such as the alkanols containing about 1 to 5 carbon atoms.

In the next step of the operation, the pyruvic aldehyde or addition product thereof is treated for conversion to quinone. The reaction involves a dehydration which brings about the cyclization of two molecules of pyruvic aldehyde or the addition product to form the quinone. The reaction is exemplified by the following example:

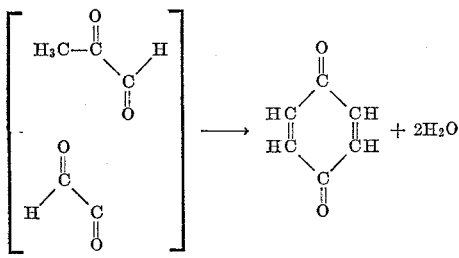

The condensation and subsequent dehydration of the aldehyde or addition product is accomplished by means of an agent such as silica gel, calcium chloride, bauxite, sodium bisulfate, potassium bisulfate, iodine, dry hydrogen chloride, phosphorous pentoxide, ultra violet light, sodium sulphite, sodamide, calcium carbide, stannous hydroxide, etc. This step may be done with the aldehyde having a pH on the acid side, namely about 1 to 6, or on the alkaline side at a pH of 8 to 12. The adjustment of pH is made by using a strong acid such as HCl, $H_2SO_4$, etc., or an alkaline agent such as NaOH, KOH, $NaHCO_3$, $Na_2CO_3$, sodium phosphate, etc.

The temperature of the dehydration step may also vary considerably, but generally, for practical considerations it is about −80° C. to 100° C. The quantities of reagent are sufficient to cause initial condensation and removal of water as shown in the reaction above. When the agent loses its dehydrating power, it may be replenished, reactivated or replaced. The quantity of condensing or dehydrating agent is about 1/100 to 4.0 moles per mole of pyruvic aldehyde, preferably about 1/10 to 2 moles per mole of aldehyde.

The ring closure step may be done batchwise or in a continuous manner. The agents may be present in a tower through which the aldehyde is passed continuously until the agent loses effectiveness. Thereafter, the aldehyde may be charged to a fresh or regenerated tower, and the tower of depleted or inactivated agent depending on its nature may be regenerated by the passage of a hot gas, such as a light or normally gaseous hydrocarbon, nitrogen, carbon dioxide, etc. The gas is admitted at a temperature sufficient to cause the agent to relinquish its water.

In the final step, if desired, the quinone is reduced to hydroquinone. For this purpose, a reducing agent is employed, such, for example, as sulfur dioxide, hydrogen gas, hydrogen chloride, hydrochloric acid with zinc or iron, sodium hydrosulphite, titanium chloride, ferrous sulphate, hydroxylamine, etc. The unique feature of this aspect of the invention is that the final step occurs as one of a series of reactions taking place within a single reaction zone. In this connection, the formation of pyruvic aldehyde can occur in the presence of an addition agent of the type described above. Later, when the addition agent is released from combination with the pyruvic aldehyde, i.e., during the cyclization of aldehyde to quinone, it causes the reduction of quinone to hydroquinone. This reduction step occurs at a temperature of about −50° C. to 100° C., preferably about 10° to 120° C. The pressure of the reaction may also be subatmospheric, atmospheric, or superatmospheric.

The reducing agent is present in an amount sufficient to cause all or substantially all of the quinone to be reduced to hydroquinone. Thus, at least a stoichiometric amount of reducing agent is present, and preferably a molar excess of about 0.1 to 2 moles is employed.

The nature of the formation of quinone and its reduction to hydroquinone is illustrated by reference to the following exemplary reactions:

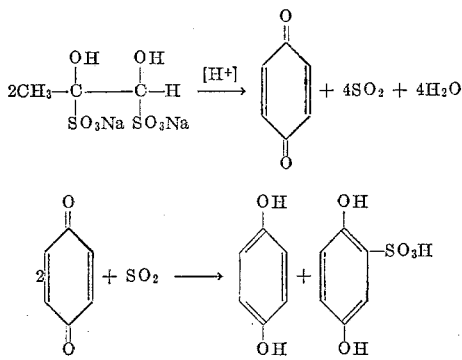

In operation, the pyruvic aldehyde produced is passed to a zone in which is present an addition agent. For this purpose, the addition agent is one which is capable not only of adding to the pyruvic aldehyde, but also, it can be easily converted to a reducing agent or becomes one upon being released from the pyruvic aldehyde. In this connection, the addition agent is sodium bisulfite or sulphurous acid.

The addition product of pyruvic aldehyde, if desired, is adjusted in pH prior to the dehydration step in which cyclization of aldehyde to quinone occurs. If the addition agent is a reducing agent under acidic conditions, then the pH of the addition product is adjusted accordingly. In the case of sodium bisulfite and sulphurous acid, the pH of the addition agent is adjusted to about 2 to 6. This is done by the use of an acid, such as HCl or sulphuric acid. The quinone and the reducing agent are in contact with each other for a sufficient period of time to reduce the quinone to hydroquinone.

In another aspect of the invention, vaporous pyruvic aldehyde is passed through a column or tower of condensing or dehydrating agent, such as silica gel, etc., and concomitantly vaporous or liquid reducing agent is charged thereto to reduce the quinone produced to hydroquinone. The tower is packed with solid dehydrating agent, and vaporous pyruvic aldehyde is charged to the bottom part thereof along with vaporous or gaseous reducing agent, e.g., $SO_2$, etc. If the reducing agent is liquid, it may be charged at the upper part of the tower, for downward flow therein.

For a better understanding of the present invention, reference will now be had to specific examples thereof.

In FIG. 1 of the accompanying drawing, which forms part of the specification, propylene gas is fed from a source 5 to a tower 6 in which is present $SeO_2$, at a rate depending on tower size. The temperature in tower 6 is about 50° C., and the tower is under vacuum. In the tower, the propylene is oxidized to pyruvic aldehyde. The pyruvic aldehyde leaves the oxidizer tower 6 through an overhead line 7 and is condensed to a liquid in cooler 8. The liquid pyruvic aldehyde is fed to a vessel 9 by means of a line 10, wherein it is dissolved in ethyl ether or methylene chloride, etc., which is fed thereto from a source 11 at a rate depending again on the size of the equipment. The ether or methylene chloride solution is discharged from vessel 9 via line 12, and then 1 N KOH is added through line 14, and then 1 N $H_2SO_4$ via line 15 to provide a pH of 2.

The acid solvent mixture is fed to tower 16 containing $CaCl_2$ to dry the ether of methylene chloride layer.

The temperature in the tower is 10° C. The stream resides in the tower 16 until completely dry and then it is discharged from the overhead line 17. The product stream in line 17 passes to a fractionating column 18 wherein the solvent is distilled off as an overhead stream in line 20, and the quinone is yielded from the bottom of the tower in line 21. The quinone passes to a vessel 22 to which is charged water from a source 23 and $SO_2$ from a line 24. The temperature in the reducer vessel 22 is 20° C., and the pressure is atmospheric. The reaction mass resides in the reducer 22 until colorless before the mass, which is hydroquinone, is withdrawn therefrom through a line 26.

In FIG. 2, acetone is fed to an oxidizer column 30 from line 31. The column 30 contains $SeO_2$. The acetone passes through oxidizer 30 at a temperature of 50° C., under vacuum. The vaporous pyruvic aldehyde is yielded overhead from the tower 30 through a line 32, passes through a cooler 33 to become liquid, and thence through a line 34. From line 34, the liquid pyruvic aldehyde passes into an additional vessel 35. Sodium bisulfite is fed to the vessel 35 through a line 36. The temperature in the vessel 35 is about 10° C., and the pressure is under vacuum. The sulfite addition product leaves the vessel 35 through a line 37.

The sulfite addition product enters a drier 38 wherein uncombined water present with the addition product is removed. Thereafter, the dried addition product leaves the drier 38 through a line 39, and enters an acidifier vessel 40. The addition product is acidified to a pH of 2 by the addition of HCl through line 41. The acidified addition product now contains $SO_2$ and it is discharged with the reaction mixture from the vessel 40 via a line 42.

The reaction mixture and $SO_2$ enters a dehydrator 44 in which is contained silica gel. The temperature in the dehydrator is about 10° C., and it is under vacuum. As a result of conditions in the dehydrator 44, the $SO_2$ reduces the quinone to hydroquinone. The reaction mass leaves the dehydrator 44 and enters a gas separator 46. In the gas separator 46, all the hydroquinone product is withdrawn through line 47, and gaseous $SO_2$ is discharged therefrom by means of line 48. The $SO_2$ may be wholly or in part recycled to the dehydrator 44 through a line 49, or all or part can be yielded from the system through a line 50.

While there have been shown preferred processes in accordance with the invention, it will be appreciated that many changes may be made therein without departing from the essential spirit of the invention as defined in the annexed claims.

What I claim is:
1. A process which comprises:
   (A) producing pyruvic aldehyde, and
   (B) passing the pyruvic aldehyde through a zone containing an agent effecting dehydration of the pyruvic aldehyde and bringing about the cyclization of two molecules of pyruvic aldehyde to form quinone.
2. A process as set forth in claim 1, wherein said agent is selected from the class consisting of silica gel, calcium chloride, bauxite, sodium bisulfate, potassium bisulfate, iodine, dry hydrogen chloride, phosphorus pentoxide, sodium sulfite, sodamide, calcium carbide, and stannous hydroxide.
3. A process as set forth in claim 1, which is carried out with an aldehyde having a pH on the acid side in the range of about 1 to 6.
4. A process as set forth in claim 1, which is carried out with an aldehyde having a pH on the alkaline side in the range of about 8 to 12.
5. A process as set forth in claim 1, wherein the quantity of agent is about $1/10$ to 2 moles per mole of aldehyde.
6. A process as set forth in claim 1, further including the step of converting quinone to hydroquinone by subjecting the quinone to a reducing agent.
7. A process as set forth in claim 1, wherein the pyruvic aldehyde, before being passed into said zone, is converted to an addition product to transform the pyruvic aldehyde to a nonpolymerizable state.
8. A process as set forth in claim 7, wherein said pyruvic aldehyde is reacted with a compound selected from the class consisting of sodium bisulfite, hydrocyanic acid, and sulphurous acid, to form said addition product.

References Cited

De V. Moulds et al.: Chemical Society Journal London (January–June) 1938, p. 621–626.

LORRAINE A. WEINBERGER, Primary Examiner

L. A. THAXTON, Assistant Examiner

U.S. Cl. X.R.

260—596, 597, 621, 593

UNITED STATES PATENT OFFICE
CERTIFICATE OF CORRECTION

Patent No. 3,499,011    Dated    March 3, 1970

Inventor(s)    Clifton P. Idyll

It is certified that error appears in the above-identified patent and that said Letters Patent are hereby corrected as shown below:

The example on page 3, lines 16 et seq., should read: (the left portion thereof)

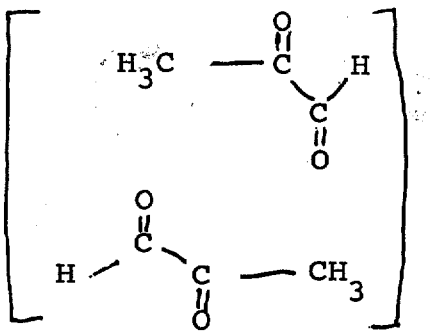

Column 4, last line, "of" should read -- or --

SIGNED AND
SEALED
OCT 6 - 1970

(SEAL)
Attest:

Edward M. Fletcher, Jr.

Attesting Officer

WILLIAM E. SCHUYLER, JR.
Commissioner of Patents